United States Patent [19]
Loxton et al.

[11] Patent Number: 5,544,917
[45] Date of Patent: Aug. 13, 1996

[54] SEAT BELT WEBBING GUIDE ASSEMBLY

[75] Inventors: Steven R. Loxton, Lakeport; Donald P. Czarnecki, Marysville, both of Mich.

[73] Assignee: TRW Vehicle Safety Systems Inc., Lyndhurst, Ohio

[21] Appl. No.: 502,169

[22] Filed: Jul. 13, 1995

[51] Int. Cl.⁶ .................................................. B60R 22/00
[52] U.S. Cl. ........................ 280/801.2; 280/808; 297/473
[58] Field of Search ............................ 280/801.2, 808; 297/473

[56] References Cited

U.S. PATENT DOCUMENTS

| | | | |
|---|---|---|---|
| 4,093,274 | 6/1978 | Scholz et al. | 280/808 |
| 4,469,352 | 9/1984 | Korner et al. | 280/808 |
| 4,547,717 | 10/1985 | Radermacher et al. | 280/801.2 |
| 4,702,493 | 10/1987 | Escaravage | 280/801.2 |
| 4,832,280 | 5/1989 | Haland et al. | 242/107 |
| 4,938,914 | 7/1990 | Escaravage et al. | 280/801.2 |
| 4,940,254 | 7/1990 | Ueno | 280/801.2 |
| 5,088,794 | 2/1992 | Iwami et al. | 297/483 |
| 5,123,673 | 6/1992 | Tame | 280/808 |

Primary Examiner—Kenneth R. Rice
Attorney, Agent, or Firm—Tarolli, Sundheim, Covell, Tummino & Szabo

[57] ABSTRACT

A seat belt webbing guide assembly (40) includes a closure member (90) which has a slot (164) and is rotatable about a first, generally horizontal, axis (92). The closure member (90) is housed within an inner support member (80) which is rotatable about a second, generally vertical, axis (94). Seat belt webbing extends through the slot (164). Tension in the seat belt webbing adjusts the position of the closure member (90) and slot (164).

18 Claims, 6 Drawing Sheets

SEAT BELT WEBBING GUIDE ASSEMBLY

FIELD OF THE INVENTION

The present invention relates to a seat belt system for restraining a vehicle occupant, and particularly relates to a seat belt system including a seat belt webbing guide assembly having a slot through which the seat belt webbing extends.

BACKGROUND OF THE INVENTION

A known seat belt system for restraining a vehicle occupant directs the seat belt webbing to extend over the occupant. For example, in a three point seat belt system, one end of the webbing is wound onto a spool of a seat belt retractor which is fixed to a vehicle. The other end of the webbing is connected to a webbing anchor which is also fixed to the vehicle. A tongue is slidable along the length of the webbing. The system further includes a buckle which is fixed to the vehicle.

When the tongue on the webbing is locked in the buckle, a lap belt portion of the webbing extends across the occupant's lap, and a shoulder belt portion of the webbing extends across the occupant's torso. It is desirable for the shoulder belt portion of the webbing to lie flat against the torsos of various sized occupants.

SUMMARY OF THE INVENTION

The present invention is a vehicle safety apparatus for restraining an occupant in a seat of a vehicle. The safety apparatus includes seat belt webbing extendable about the vehicle occupant. The safety apparatus further includes a structure having an opening through which the webbing extends. A movable closure member, which at least partially blocks the opening in the structure, has a slot through which the webbing extends. A support means supports the closure member for rotational movement relative to the structure about a first axis and supports the closure member for rotational movement relative to the structure about a second axis which extends transverse to the first axis.

In a preferred embodiment, the vehicle safety apparatus includes an outer support member having a first opening, an inner support member which at least partially blocks the first opening and has a second opening, and a movable closure member which at least partially blocks the second opening and has a slot through which the webbing extends. The closure member is supported by the inner support member for rotational movement relative to the inner support member about a first axis and the inner support member is supported by the outer support member for rotational movement relative to the outer support member about a second axis which extends transverse to the first axis.

BRIEF DESCRIPTION OF THE DRAWINGS

The foregoing and other features of the present invention will become apparent to those skilled in the art to which the present invention relates from reading the following specification with reference to the accompanying drawings, wherein.

DESCRIPTION OF A PREFERRED EMBODIMENT

General Description

Figure 1:
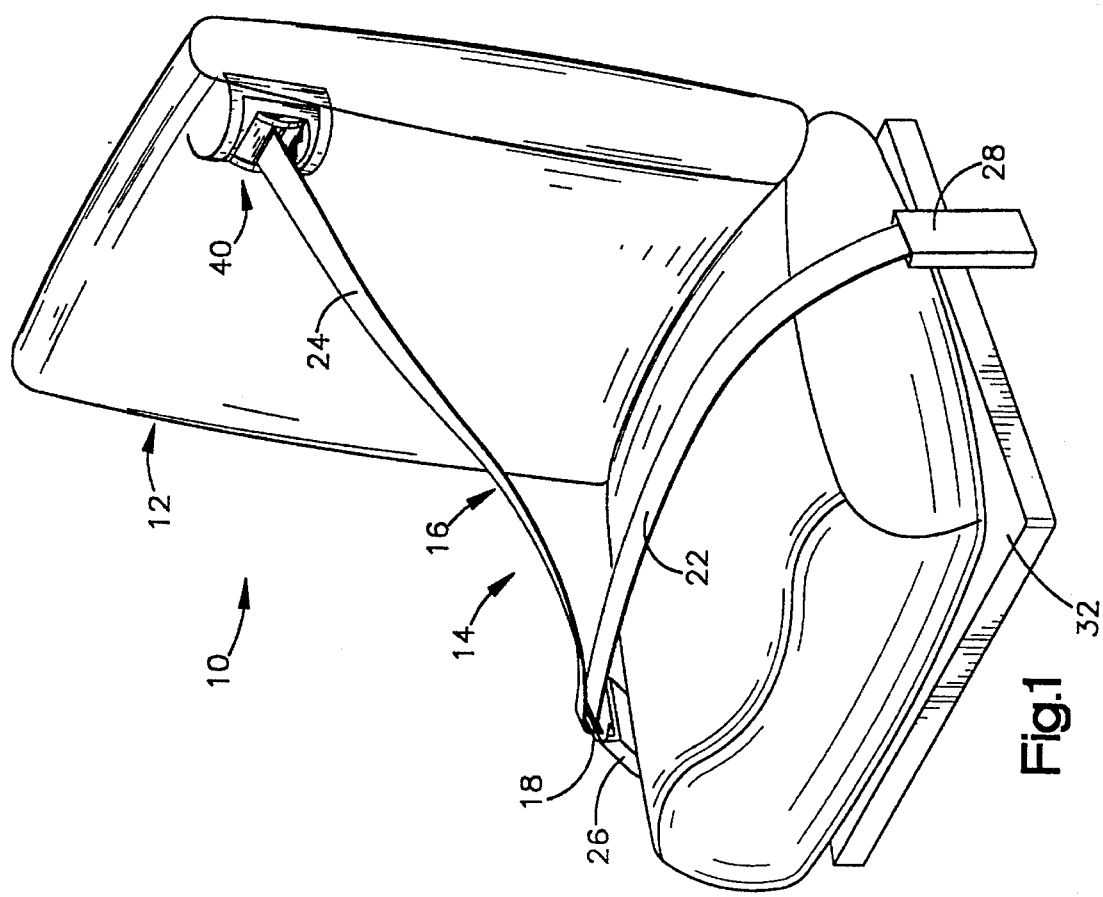
FIG. 1 is a perspective view of a vehicle safety apparatus comprising a preferred embodiment of the present invention.

As representative of the present invention, FIG. 1 illustrates schematically a vehicle safety apparatus 10. The safety apparatus 10 includes a seat 12 for an occupant of a vehicle and a three point continuous loop seat belt system 14. The seat belt system 14 includes a single continuous length of seat belt webbing 16 for restraining an occupant of the seat 12. A tongue 18 is located on the seat belt webbing 16 and is movable on the webbing. The seat belt webbing 16 is divided by the movable tongue 18 into a lap portion 22 and a shoulder portion 24. The tongue 18 is releasably lockable with a buckle 26 anchored to a seat base 32.

One end of the length of seat belt webbing 16 is connected, at an anchor point 28, to the seat base 32. The anchor point 28 is disposed adjacent a side of the seat 12 opposite the buckle 26. The opposite end of the length of seat belt webbing 16 extends from a seat belt retractor (not shown) through a webbing guide assembly 40 disposed in the upper portion of the seat 12. As known in the art, the seat belt retractor contains a spool and a rewind spring. The opposite end of the length of seat belt webbing 16 is connected to the spool, and the webbing is thus anchored by the retractor.

The seat belt webbing 16 is movable between a fully retracted position and a fully withdrawn position upon winding and unwinding of the seat belt webbing on the spool in the retractor. When the seat belt webbing 16 is in the fully retracted position fully wound onto the spool, the tongue 18 is in its initial rest position. In its initial rest position, the tongue 18 rests on the webbing guide assembly 40. When the seat belt webbing 16 is in the fully withdrawn position, it is unwound from the spool sufficiently to extend over the occupant of the seat 12 and enable the tongue 18 to be latched in the buckle 26.

The rewind spring in the retractor is stressed as the spool rotates in an unwinding direction when a vehicle occupant withdraws the seat belt webbing 16 from the retractor and moves the tongue 18 towards the buckle 26. When the vehicle occupant releases the tongue 18 from the buckle 26, the rewind spring rotates the spool in the winding direction to retract the seat belt webbing 16 into the retractor, and thereby to move the seat belt webbing back to the fully retracted position. As known in the art, the retractor further includes a locking mechanism for blocking unwinding rotation of the spool in response to a condition indicating the occurrence of vehicle deceleration above a predetermined deceleration.

In accordance with the present invention, the webbing guide assembly 40 (FIG. 3) includes a housing 42 which mounts the guide assembly 40 to a portion of a seat frame 44 in the upper portion of the seat 12 above the seat belt retractor. The housing 42 (FIG. 6) has parallel side walls 46 and 48 and a back wall 52 which connects the side walls.

The walls 46, 48 and 52 cooperate to form a rectangular mounting section 54. The housing 42 has two parallel elongated housing arms 56 (FIG. 3) extending vertically from the rectangular mounting section 54.

Figure 3:
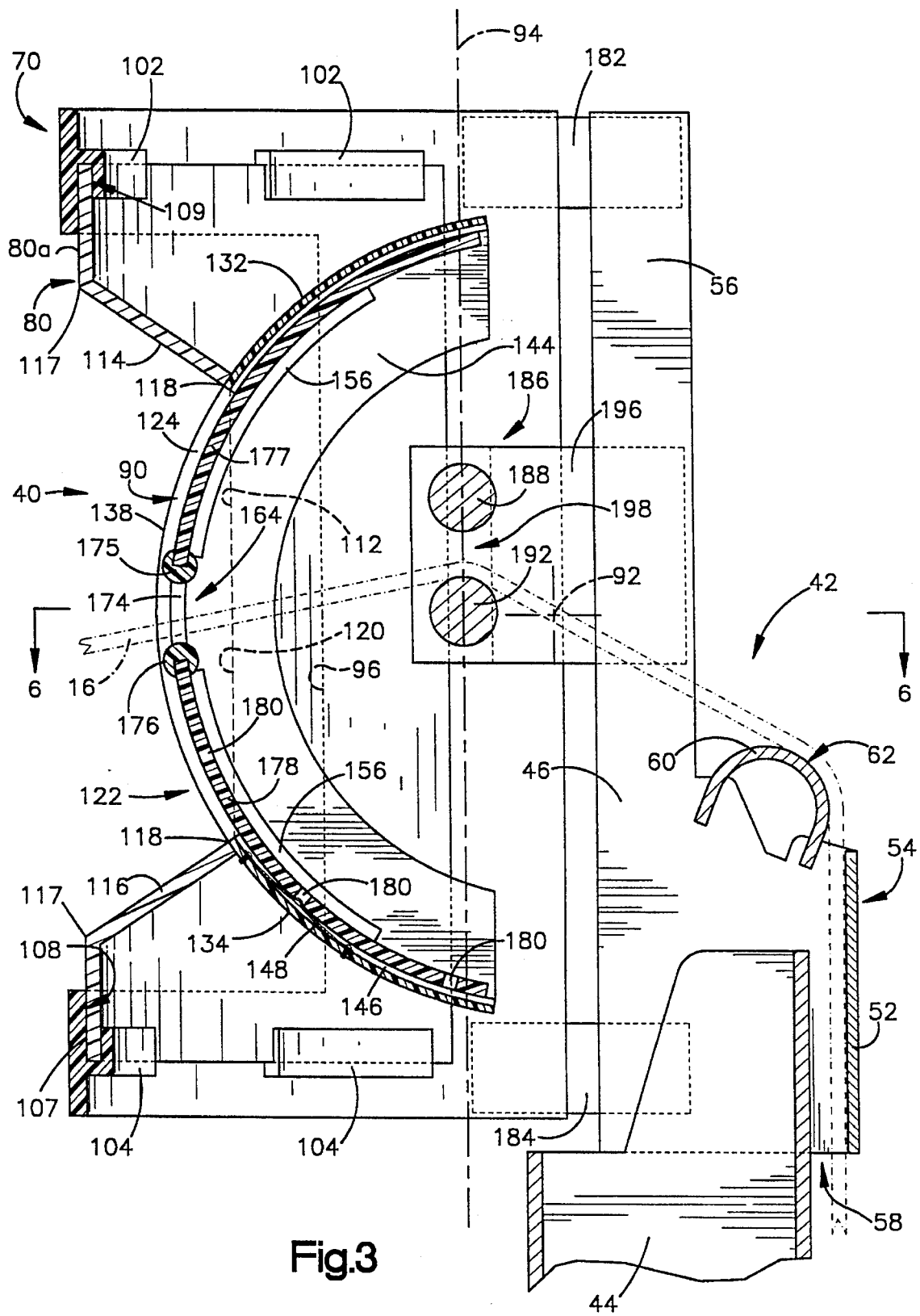
FIG. 3 is a sectional view of the apparatus of FIG. 2.
Figure 6:
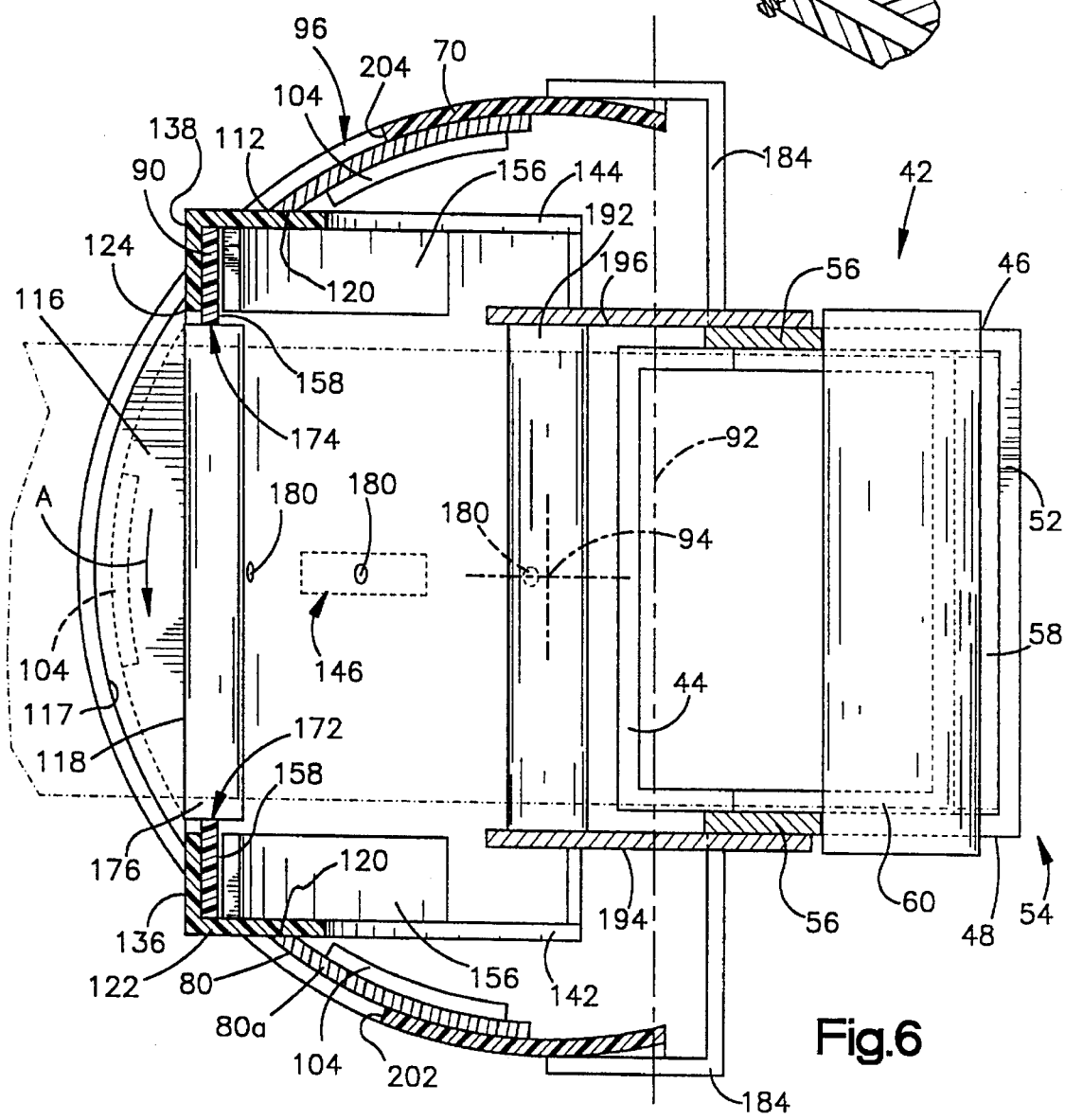
FIG. 6 is a sectional view taken along line 6—6 of FIG. 3.

The side walls 46 and 48 of the rectangular mounting section 54 mount to opposite sides of the seat frame 44 such that a webbing channel 58 is formed between the back wall 52 of the rectangular mounting section and the seat frame 44 (FIG. 3 and FIG. 6). The seat belt webbing 16 extends upward from the retractor through the webbing channel 58 (FIG. 3).

A webbing deflector 60 is mounted to, and extends across, the top of the side walls 46 and 48 of the rectangular mounting section 54. The webbing deflector 60 has a curved surface 62 which guides the seat belt webbing 16 from the seat belt retractor towards the webbing guide assembly 40 and thus, towards the vehicle occupant.

The webbing guide assembly 40 (FIG. 2) includes a generally cylindrical outer support member 70, a generally cylindrical movable inner support member 80 and a generally cylindrical movable closure member 90. The movable closure member 90 is supported within the inner support member 80 for rotational movement about a first, generally horizontal, axis 92. The inner support member 80 is supported within the outer support member 70 for rotational movement about a second, generally vertical, axis 94.

Outer Support Member

The generally cylindrical outer support member 70 is convexly curved about the second axis 94 as shown in FIG. 6 at a first predetermined radius. The outer support member 70 has a first elongated rectangular opening 96 centrally disposed within the outer support member. The surfaces defining the rectangular opening 96 in the outer support member 70 are also convexly curved about the second axis 94 as shown by arrow A in FIG. 6.

Extending from the interior surface 108 of the outer support member 70 are upper and lower mounting tabs 102 and 104 (FIG. 3). The mounting tabs 102 and 104 are adjacent to the rectangular opening 96. Three upper mounting tabs 102 extend downward from an upper wall portion of the outer support member 70. Three lower mounting tabs 104 extend upward from a lower wall portion of the outer support member 70. The mounting tabs 102 and 104 are equally spaced from the interior surface 108 of the outer support member 70 such that they define a horizontal guide channel 106 (FIG. 7) convexly curved about the second axis 94. The mounting tabs 102 and 104 can either be integral with the outer support member 70 as shown in the drawings or attached by conventional means to the outer support member.

Inner Support Member

The generally cylindrical inner support member 80 has a curved portion 80a which is convexly curved about the second axis 94 at a second predetermined radius which is slightly smaller than the first predetermined radius of curvature of the outer support member 70. The inner support member 80 is rotatably received within the horizontal guide channel 106 (FIG. 7) of the outer support member 70. The exterior surface 107 of the inner support member 80 fits inside and slidably engages the interior surface 108 of the outer support member 70. Moreover, the interior surface 109 of the inner support member 80 fits inside and slidably engages surfaces of the upper and lower mounting tabs 102 and 104 (FIG. 3).

The inner support member 80 further includes a centrally disposed second elongated rectangular opening 112 (FIG. 6). The second rectangular opening 112 is smaller in both width and length than the first rectangular opening 96.

The inner support member 80 has a planar upper lip portion 114 downwardly extending at an angle from the upper portion of the inner support member 80 (FIG. 3) to the upper edge of the second opening 112. Upwardly extending at an angle from the lower portion of the inner support member 80 to the lower edge of the second opening 112 is a planar lower lip portion 116. The lip portions 114 and 116 have arcuate edges 117 and planar edges 118. The planar edges 118 cooperate with the interior edges 120 of the inner support member 80 to form the second rectangular opening 112.

Figure 2:
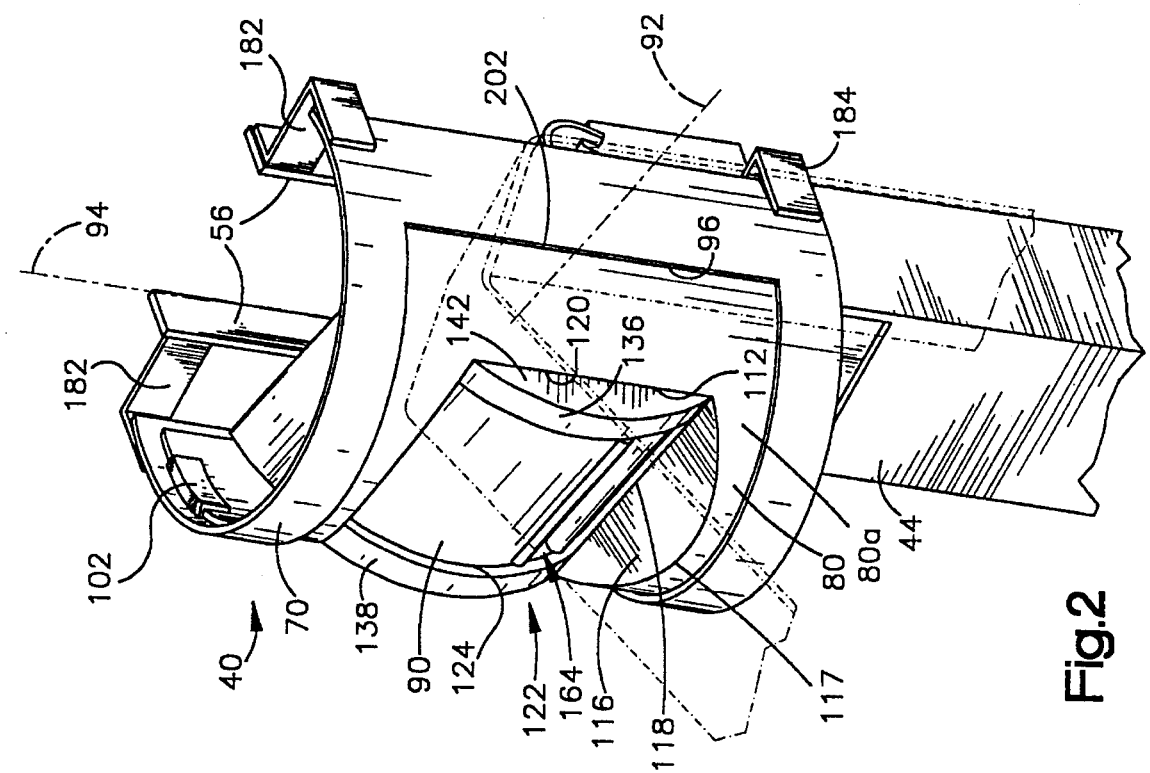
FIG. 2 is a perspective view of parts of the apparatus of FIG. 1.

The inner support member 80 further includes a generally cylindrical curved support portion 122 (FIG. 2). The curved support portion 122 is convexly curved about the first axis 92 at a third predetermined radius. The curved support portion 122 is fixedly received within the second rectangular opening 112 of the inner support member 80, such that portions of the curved support portion abut the planar edges 118 of the lip portions 114 and 116. The curved support portion 122 has a width which is slightly smaller than the width of the second opening 112. The curved support portion 122 has a centrally disposed third opening 124. The third opening 124 has approximately the same length as the second opening 112 and has a width larger than the width of the seat belt webbing 16 but smaller than the width of the second opening.

The third opening 124 is centrally located within the curved support portion 122 such that it divides the curved support portion into four parts, an upper curved support part 132 (FIG. 3), a lower curved support part 134, a right side curved support part 136 (FIG. 2) and a left side curved support part 138. Extending rearwardly from an outer edge of the right side part 136 is a right side wall 142 (FIG. 2). Extending rearwardly from an outer edge of the left side part 138 is a left side wall 144 (FIG. 3). Both the right and left side parts 136 and 138 are convexly curved about the first axis 92.

Both the right side curved support member part 136 and the left side curved support member part 138 extend through the second opening 112 (FIG. 2). Also extending through the second opening 112 are portions of both the right side wall 142 and the left side wall 144. Both the upper curved support member part 132 and the lower curved support member part 134 remain concealed behind the curved portion 80a of the inner support member 80 (FIG. 3).

Figure 5:
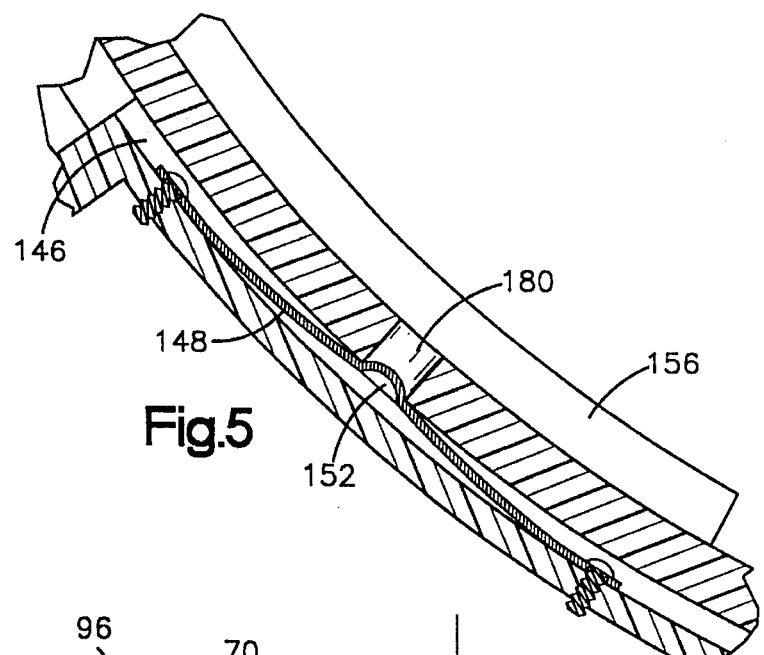
FIG. 5 is an enlarged view of parts of the apparatus shown in FIG. 3.

Disposed within the interior surface of the lower curved support member part 134 is a recess 146 which houses a detent spring 148. The detent spring 148 is best shown in FIG. 5. The detent spring 148 has an embossed area 152 which functions as a detent.

Figure 4:
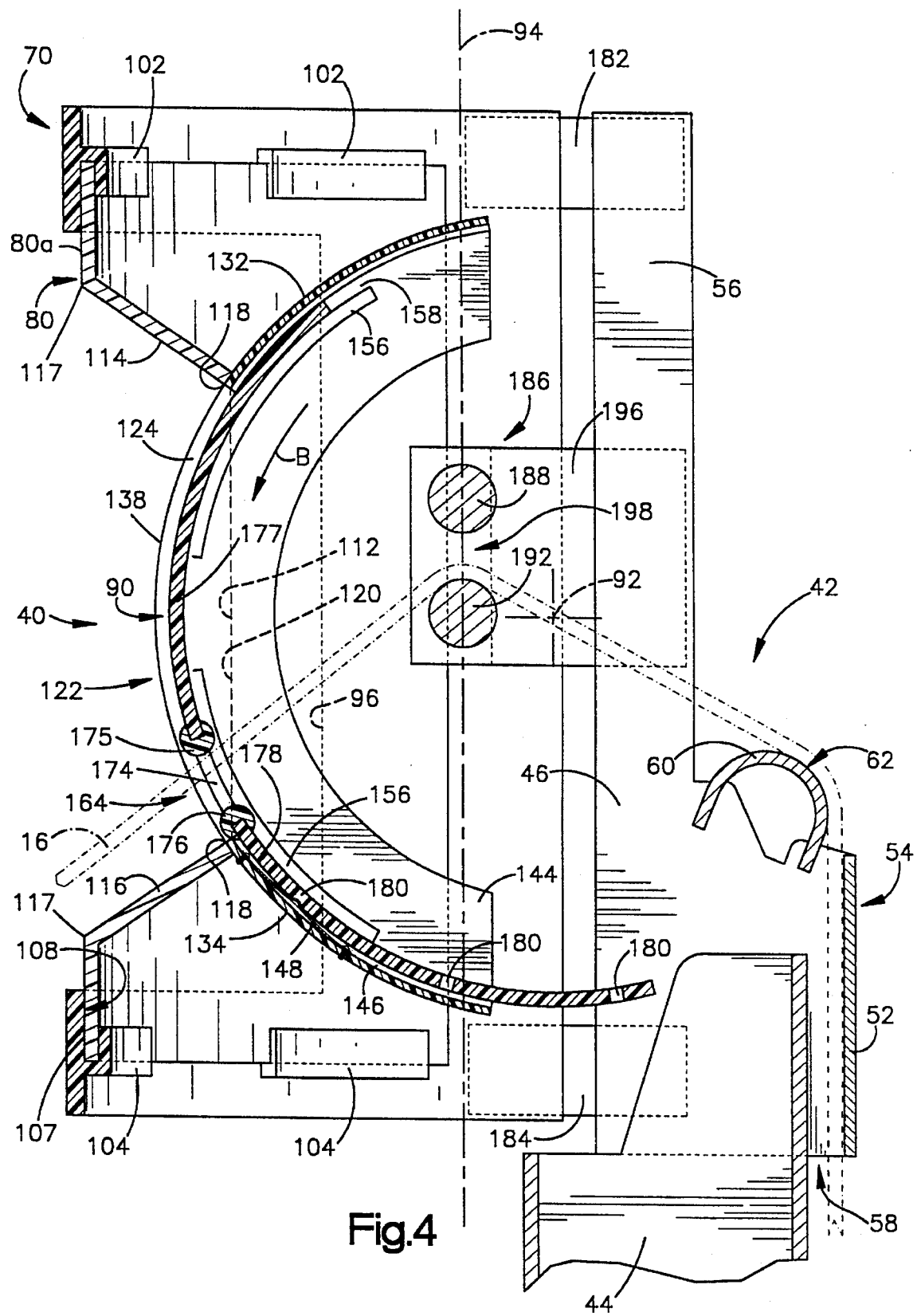
FIG. 4 is a view similar to FIG. 3 showing parts in a different position.

Disposed on the inner surfaces of both the right side wall 142 and the left side wall 144 are curved mounting tabs 156 (FIG. 6) which cooperate to form a vertical guide channel 158 convexly curved about the first axis 92, as shown by arrow B in FIG. 4.

Closure Member

The closure member 90 (FIG. 2) is generally cylindrical and is rotatably received within the vertical guide channel 158 (FIG. 4) of the curved support portion 122. The closure member 90 is convexly curved about the first axis 92 as can be seen by arrow B in FIG. 4. The closure member 90 has a width slightly smaller than the width of the curved support portion 122. The closure member 90 fits inside and slidingly engages the surfaces defining the vertical guide channel 158. The closure member 90 (FIG. 3) is centrally received within the curved support portion 122 such that the closure member essentially fills the third opening 124.

Figure 8:
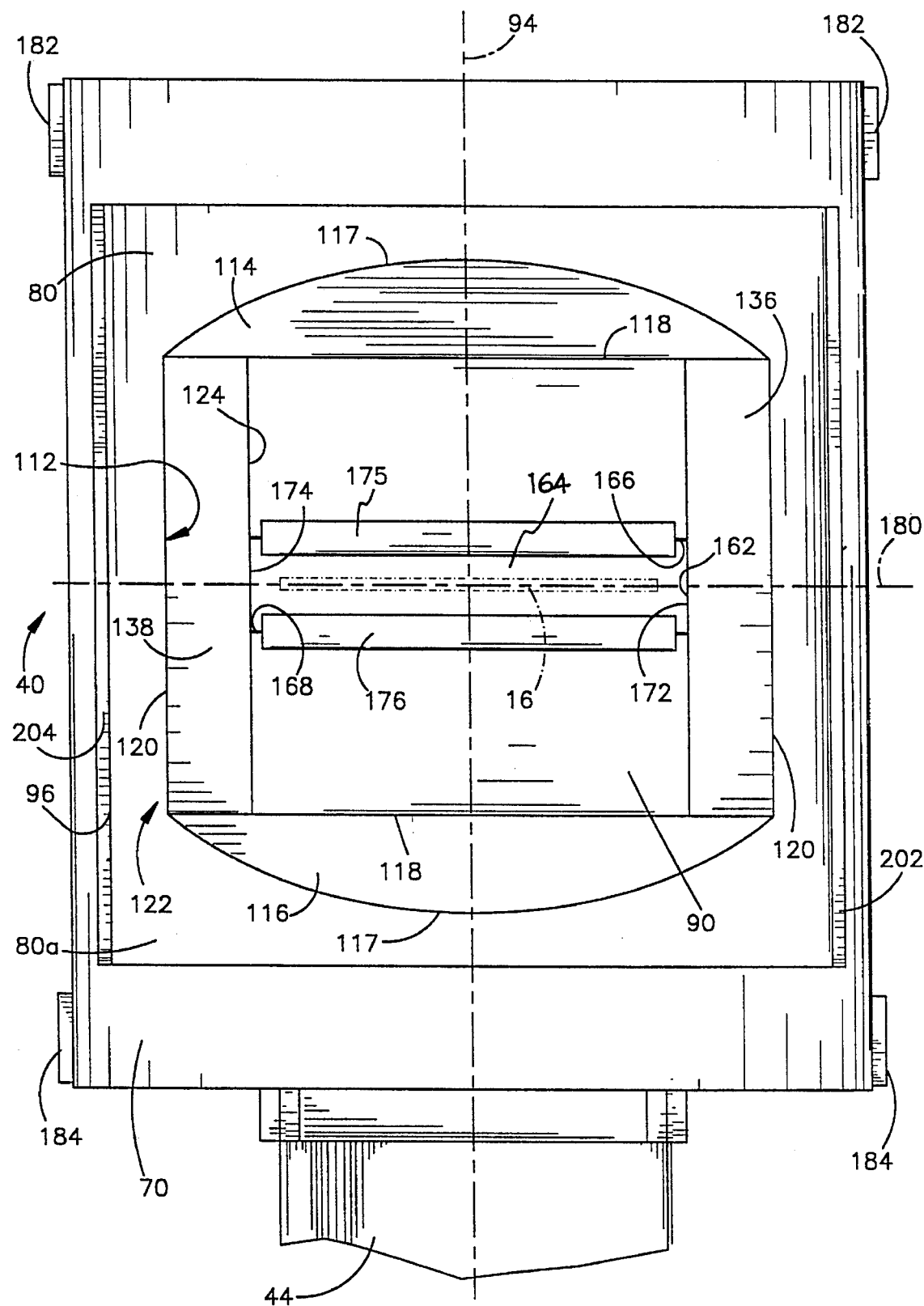
FIG. 8 is a front view of the parts shown in FIG. 2.

The closure member 90 (FIG. 8) has a rectangular inner edge 162 which defines a slot 164 through which the seat belt webbing 16 is withdrawable. The inner edge 162, and thus the slot 164, is defined by an upper surface 166, a lower surface 168, a right side surface 172 and a left side surface 174. The slot 164 has a longitudinal central axis 180, as shown in FIG. 8, which extends parallel to the first axis 92 during rotational movement of the closure member 90.

The slot 164 is further defined by an upper slot guide 175 and a lower slot guide 176. The slot guides 175 and 176 fit over and extend for substantially the entire length of the upper and lower surfaces 166 and 168, respectively. The slot guides 175 and 176 have smooth arcuate surfaces which provide a low-friction surface over which the webbing 16 can freely move.

The slot 164 is centered about and defines an upper portion 177 and a lower portion 178 of the closure member 90. The lower portion 178 of the closure member 90 has three equally spaced apart apertures 180 (FIG. 3) which are aligned with the embossed area 152 of the detent spring 148.

The webbing guide assembly 40 (FIG. 2) has upper mounting arms 182 and lower mounting arms 184. The first ends of the upper mounting arms 182 are secured to the upwardly extending housing arms 56 of the housing 42. The first ends of the lower mounting arms 184 are secured to the side walls 46 and 48 of the rectangular mounting section 54. The second ends of the mounting arms 180 and 82 are secured to the outer surface of the outer support member 70. In this arrangement, the webbing guide assembly 40 is parallel to the housing arms 56.

A structural turning loop 186 (FIG. 3) is positioned between the webbing deflector 60 and the slot 164. The structural turning loop 186 consists of an upper roller 188 and lower roller 192 mounted to the housing arms 56 by a right mounting bracket 194 (FIG. 6) and a left mounting bracket 196 (FIG. 3). The upper roller 188 and the lower roller 192 are spaced apart to define a webbing path 198 (FIG. 3) through which the seat belt webbing 16 is withdrawable.

The structural turning loop 186 guides the seat belt webbing 16 from the retractor and the webbing deflector 60 towards the slot 164 of the closure member 90. The structural turning loop 186 further aligns the seat belt webbing 16 with the slot 164 in the closure member 90, so that the seat belt webbing 16 extends through the slot to the exterior surface of the webbing guide assembly 40.

Operation

The webbing guide assembly 40 is configured to be used in connection with a vehicle safety apparatus 10. The webbing guide assembly 40 can be mounted to a seat frame 44 disposed in the upper portion of a seat 12, as shown, or to a part of a vehicle above the occupant's shoulder.

The seat belt webbing 16 extends upward from the seat belt retractor mounted in the vehicle below the webbing guide assembly 40. The seat belt webbing 16 is guided through the webbing channel 58 (FIG. 3) over the webbing deflector 60 and through the webbing path 198 of the structural turning loop 186 so that it is essentially aligned with the slot 164.

The seat belt webbing 16 extends through the slot 164 to be withdrawable by a vehicle occupant. When the seat belt webbing guide assembly 40 is in its initial rest position, the slot 164 is centered about the webbing guide assembly. When operating the vehicle safety apparatus 10, the occupant withdraws the seat belt webbing 16 and locks the tongue 18 in the buckle 26. This causes the seat belt webbing 16 to extend downward over the torso of the occupant from the slot 164 to the tongue 18. A rewind spring in the seat belt retractor then imparts tension to the seat belt webbing 16. Such tension draws the seat belt webbing 16 toward and against the torso of the occupant.

In accordance with the present invention, under the tension of the seat belt webbing 16, the webbing guide assembly 40 directs the seat belt webbing to lie flat against the torso of various sized occupants. This is accomplished by rotational movement, or adjustment, of both the inner support member 80 and the closure member 90.

Specifically, when a vehicle occupant moves the seat belt webbing 16 from the fully retracted position towards the fully withdrawn position, depending on the size of the occupant, the seat belt webbing could engage singularly or in combination, the upper slot guide 175, the lower slot guide 176, the right side surface 172 and/or the left side surface 174 of the slot 164. If the occupant is of a first predetermined size, the seat belt webbing 16 will not engage any portion of the slot 164 and the slot will remain centered about the webbing guide assembly 40 as shown in FIGS. 3 and 6.

However, if the vehicle occupant is shorter than the first predetermined size, when the seat belt webbing 16 is withdrawn, the webbing will engage the lower slot guide 176 of the slot 164. The tension in the seat belt webbing 16 will force the closure member 90 to slide, or rotate, downward about the first axis 92 within the vertical guide channel 158, as shown in FIG. 40 Thus, the slot 164 and seat belt webbing 16 are aligned such that the webbing is directed to lie flat against the vehicle occupant's torso.

Conversely, if the vehicle occupant is taller than the first predetermined size, when the seat belt webbing 16 is withdrawn, the webbing will engage the upper slot guide 175 of the slot 164. The tension in the seat belt webbing 16 will force the closure member 90 to slide, or rotate, upward about the first axis 92 within the vertical guide channel 158. Thus, the slot 164 and seat belt webbing 16 are aligned such that the webbing is directed to lie flat against the vehicle occupant's torso.

The apertures 180 and the embossed area 152 of the detent spring 148 cooperate so that the closure member 90 can rotate within the vertical guide channel 158 to three different vertical positions. A median position as shown by FIG. 3, a raised position (not shown) and a lowered position as shown by FIG. 4. It can be appreciated that the closure member 90 could have a varying number of apertures 180, so that varying possibilities of vertical positions may be attained.

Figure 7:
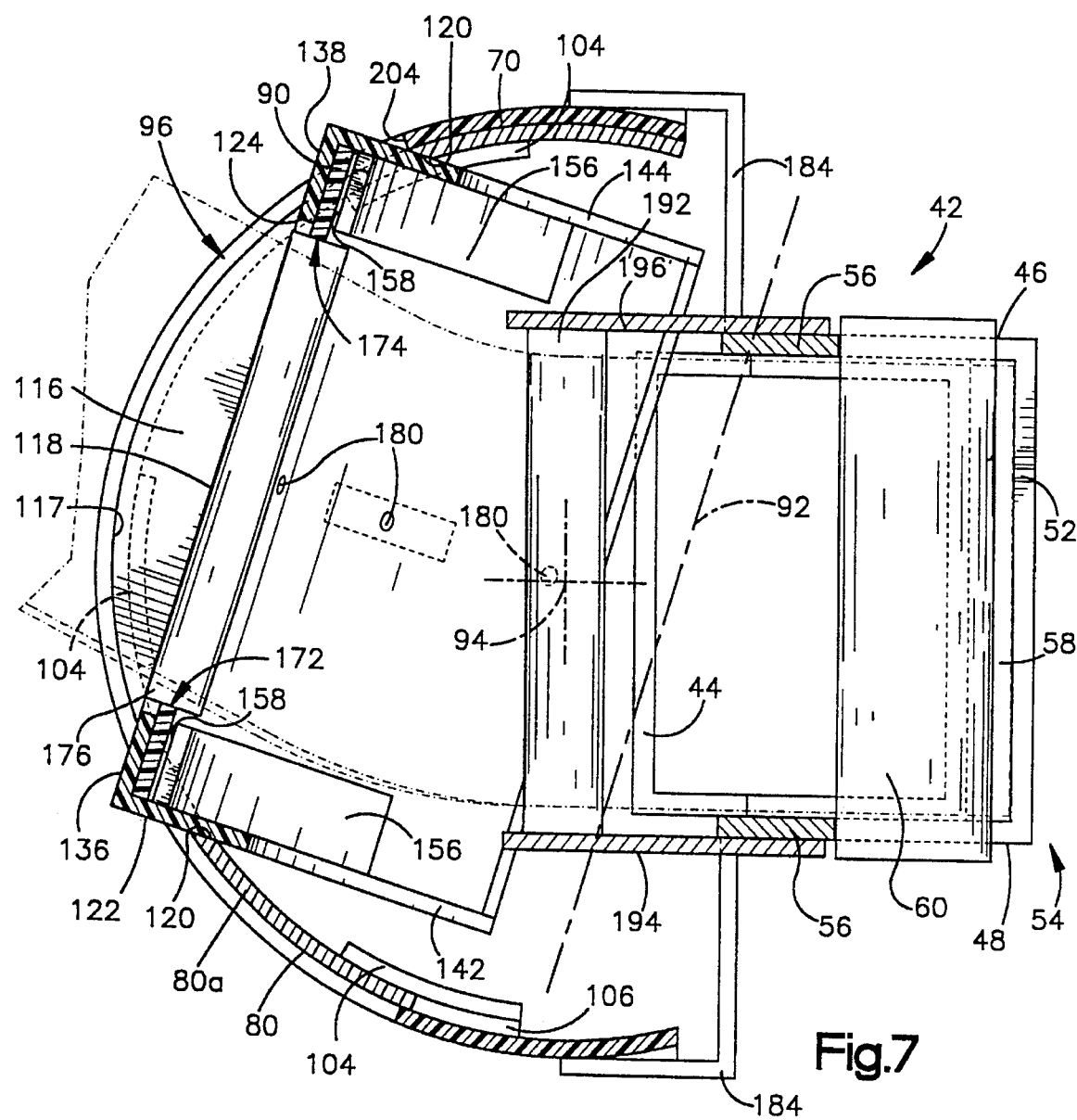
FIG. 7 is a view similar to FIG. 6 showing parts in a different position.

If the vehicle occupant is more narrow than the first predetermined size, when the seat belt webbing 16 is withdrawn, the webbing will engage the left side surface 174 of the slot 164. The tension in the seat belt webbing 16 will force the inner support member 80 to slide, or rotate, to the left, towards the buckle 26, about the second axis 94 within the horizontal guide channel 106 as shown in FIG. 7. Thus, the slot 164 and the seat belt webbing 16 are aligned such that the webbing is directed to lie flat against the vehicle occupant's torso.

If the vehicle occupant is wider than the first predetermined size, when the seat belt webbing 16 is withdrawn, the webbing will engage the right side surface 172 of the slot 164. The tension in the seat belt webbing 16 will force the inner support member 80 to slide, or rotate, to the right, towards the anchor point 28, about the second axis 94 within the horizontal guide channel 106. Thus, the slot 164 and the seat belt webbing 16 are aligned such that the webbing is directed to lie flat against the vehicle occupant's torso.

The degree of rotational adjustment of the inner support member 80 is limited to prevent the seat belt webbing 16 from engaging the outer support member 70. The right side wall 142 of the inner support member 80 abuts the right side interior edge 202 (FIG. 6) of the first opening 96 to limit rotation to the right of the inner support member. Also, the left side wall 144 of the inner support member 80 abuts the left side interior edge 204 of the first opening 96 to limit rotation to the left of the inner support member.

Both the closure member 90 and the inner support member 80 can rotate simultaneously, or independently, to achieve an infinite number of positions so that various sizes of vehicle occupants can be safely and comfortably accommodated. For example, if the vehicle occupant is both smaller and more narrow than the first predetermined size, when the seat belt webbing 16 is withdrawn, the webbing will simultaneously engage both the lower slot guide 176 and the left side surface 174 of the slot 164. The tension in the seat belt webbing 16 will force both the closure member 90 to rotate as shown in FIG. 4, and the inner support member 80 to rotate as shown in FIG. 7. Thus, the slot 164 and the seat belt webbing 16 are aligned such that the webbing is directed to lie flat against the vehicle occupant's torso.

When the tongue 18 is released from the buckle 26, the rewind spring rotates the spool to return the seat belt webbing 16 to its fully retracted position. As the seat belt webbing 16 returns to the retractor, it engages the upper slot guide 175, the lower slot guide 176, the right side surface 172 and/or the left side surface 174 of the slot 164 causing the closure member 90 and the inner support member 80 to counter-rotate and return the webbing guide assembly 40 to its initial rest position.

From the above description of the invention, those skilled in the art will perceive improvements, changes, and modifications of the invention. Such improvements, changes, and modifications within the skill of the art are intended to be covered by the appended claims.

Having described the invention, the following is claimed:

1. An apparatus for restraining a vehicle occupant, said apparatus comprising:

seat belt webbing extendable about the vehicle occupant;

a structure having an opening through which said webbing extends;

a movable closure member which at least partially blocks the opening in said structure and has a slot through which said webbing extends; and support means for supporting said closure member for rotational movement relative to said structure about a first axis and for supporting said closure member for rotational movement relative to said structure about a second axis which extends transverse to said first axis to enable the position of said slot to be adjusted to accommodate vehicle occupants of different sizes.

2. An apparatus as set forth in claim 1 wherein said closure member is simultaneously rotatable about said first and second axes.

3. An apparatus as set forth in claim 1 wherein said first axis is generally horizontal and said second axis is generally vertical.

4. An apparatus as set forth in claim 1 wherein said closure member has an arcuate outer side surface having a center of curvature on said first axis, said support means having an arcuate outer side surface having a center of curvature on said second axis.

5. An apparatus as set forth in claim 1 wherein said closure member is a portion of a cylinder having a center of curvature on said first axis and said support means is a portion of a cylinder having a center of curvature on said second axis.

6. An apparatus as set forth in claim 1 wherein said slot has a longitudinal central axis which extends parallel to said first axis during rotational movement of said closure member relative to said structure about said second axis.

7. An apparatus as set forth in claim 6 wherein said structure is a portion of a cylinder having a center of curvature on said second axis.

8. An apparatus as set forth in claim 1 further including detent means for releasably retaining said closure member against movement relative to said support means.

9. An apparatus for restraining a vehicle occupant, said apparatus comprising:

seat belt webbing extendable about the vehicle occupant;

an outer support member having a first opening;

an inner support member which at least partially blocks said first opening, and has a second opening;

a movable closure member which at least partially blocks said second opening and has a slot through which said webbing extends, said closure member being supported by said inner support member for rotational movement relative to said inner support member about a first axis, said inner support member being supported by said outer support member for rotational movement relative to said outer support member about a second axis.

10. An apparatus as set forth in claim 9 wherein said inner support member includes a curved support member which at least partially blocks said second opening, and has a third opening, said movable closure member blocking said third opening and being supported at least partially by said curved support member for rotational movement relative to said curved support member about said first axis.

11. An apparatus as set forth in claim 9 wherein said outer support member comprises means for defining a horizontal guide channel in which said inner support member is supported for rotational movement relative to said outer support member about said second axis.

12. An apparatus as set forth in claim 9 wherein said inner support member comprises means for defining a vertical guide channel in which said closure member is supported for rotational movement relative to said inner support member about said first axis.

13. An apparatus as set forth in claim 9 wherein said outer support member and said inner support member are portions of cylinders having centers of curvature on said second axis and said closure member is a portion of a cylinder having a center of curvature on said first axis.

14. An apparatus as set forth in claim 9 further comprising means for limiting the rotational movement of said closure member about said first axis.

15. An apparatus as set forth in claim 9 further comprising means for limiting the rotational movement of said inner support member about said second axis.

16. An apparatus as set forth in claim 9 wherein said closure member and said inner support member are simultaneously rotatable about said first and second axes.

17. An apparatus as set forth in claim 9 wherein said first axis is generally horizontal and said second axis is generally vertical.

18. An apparatus as set forth in claim 14 further comprising means for limiting the rotation movement about said second axis of said inner support member.

\* \* \* \* \*